US010613708B2

(12) United States Patent
Asayag et al.

(10) Patent No.: US 10,613,708 B2
(45) Date of Patent: Apr. 7, 2020

(54) CLONING A HYPERVISOR (71) Applicant: Red Hat Israel, Ltd., Raanana (IL)

(72) Inventors: Mordechay Asayag, Netanya (IL); Michael Kolesnik, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 193 days.

(21) Appl. No.: 15/442,419

(22) Filed: Feb. 24, 2017

(65) Prior Publication Data

US 2018/0246747 A1 Aug. 30, 2018

(51) Int. Cl.
*G06F 9/455* (2018.01)
*G06F 3/0482* (2013.01)

(52) U.S. Cl.
CPC ........ *G06F 3/0482* (2013.01); *G06F 9/45533* (2013.01)

(58) Field of Classification Search
CPC .................................................. G06F 9/45533
USPC .............................................................. 718/1
See application file for complete search history.

(56) References Cited

U.S. PATENT DOCUMENTS

| | | | | |
|---|---|---|---|---|
| 8,281,304 B2* | 10/2012 | Kimura | ...................... | G06F 9/52 718/1 |
| 8,458,694 B2* | 6/2013 | Chess | ....................... | G06F 8/63 718/1 |
| 8,463,882 B2* | 6/2013 | Witt | ...................... | G06F 9/5077 709/220 |
| 8,484,653 B2* | 7/2013 | Tsirkin | ................ | G06F 9/45533 718/104 |
| 8,775,625 B2* | 7/2014 | Narayanaswamy | .. | G06F 9/4856 709/226 |
| 8,832,352 B2* | 9/2014 | Tsirkin | ................ | G06F 9/45558 711/163 |
| 8,887,158 B2* | 11/2014 | Gebhart | .............. | G06F 9/45533 718/1 |
| 9,069,588 B2* | 6/2015 | Safari | .................. | G06F 11/1433 |
| 9,170,831 B2* | 10/2015 | Robinson | ................ | G06F 9/485 |
| 9,417,757 B1* | 8/2016 | Caiani | ..................... | G06F 3/048 |
| 9,459,803 B1* | 10/2016 | Yang | ................... | G06F 9/45558 |
| 9,940,148 B1* | 4/2018 | Dannowski | ......... | G06F 9/45533 |

(Continued)

OTHER PUBLICATIONS https://ekrejci.wordpress.com/2012/07/26/cloning-datacenters-between-2-vcenters-with-powercli-including-permissions-and-many-more/, Cloning Datacenters Between 2 Vcenters With Powercli, Including Permissions and Many More, Jul. 26, 2012, 10 pages.

(Continued)

*Primary Examiner* — Mehran Kamran
(74) *Attorney, Agent, or Firm* — Lowenstein Sandler LLP (57) ABSTRACT Systems and methods for hypervisor cloning. An example method may comprise: receiving a request to install and configure cloned hypervisors on host systems, wherein, for each of the cloned hypervisors, the request comprises identification information for each of the cloned hypervisors; identifying, via the virtualization manager, an existing hypervisor installed on another host system, the existing hypervisor operating in a satisfactory state and having a set of configuration parameters; and transmitting one or more clone commands to the host systems in view of the identification information for each of the cloned hypervisors, wherein each of the clone commands causes a respective host system to install and configure one of the cloned hypervisors according to the set of configuration parameters of the existing hypervisor.

20 Claims, 7 Drawing Sheets

(56) References Cited

U.S. PATENT DOCUMENTS

| | | | | |
|---|---|---|---|---|
| 2009/0083735 A1* | 3/2009 | Kimura | G06F 9/52 | 718/1 |
| 2009/0228883 A1* | 9/2009 | Gebhart | G06F 9/45533 | 718/1 |
| 2010/0023667 A1* | 1/2010 | Fukutomi | G06F 13/24 | 710/269 |
| 2012/0089666 A1* | 4/2012 | Goswami | G06Q 10/103 | 709/203 |
| 2012/0254865 A1* | 10/2012 | Saeki | G06F 8/67 | 718/1 |
| 2013/0139155 A1* | 5/2013 | Shah | G06F 9/45558 | 718/1 |
| 2013/0275975 A1* | 10/2013 | Masuda | G06F 9/5077 | 718/1 |
| 2013/0318595 A1* | 11/2013 | Wang | G06F 9/45558 | 726/16 |
| 2014/0123138 A1* | 5/2014 | Lee | G06F 9/45558 | 718/1 |
| 2014/0259014 A1* | 9/2014 | Watanabe | G06F 9/5077 | 718/1 |
| 2014/0282508 A1* | 9/2014 | Plondke | G06F 9/45533 | 718/1 |
| 2014/0282548 A1* | 9/2014 | Lagergren | G06F 9/5077 | 718/1 |
| 2015/0081964 A1* | 3/2015 | Kihara | G06F 3/0611 | 711/114 |
| 2016/0234082 A1* | 8/2016 | Xia | H04L 41/5096 | |
| 2018/0101397 A1* | 4/2018 | Sergeev | G06F 9/45558 | |
| 2018/0157522 A1* | 6/2018 | Bafna | G06F 9/45558 | |

OTHER PUBLICATIONS https://whstatic.1and1.com/help/CloudServer/EN-US/d849925.html, Cloning a Server, 3 pages.

Eric Gray, http://www.vcritical.com/2013/12/is-everyone-but-you-deploying-a-multi-hypervisor-data-center/, Is Everyone but You Deploying a Multi-Hypervisor Data Center?, Dec. 13, 2013, 2 pages.

* cited by examiner

FIG 7

# CLONING A HYPERVISOR

TECHNICAL FIELD

The present disclosure is generally related to virtualization, and is more specifically related to cloning a hypervisor to one or more hosts in a data center.

BACKGROUND

Data centers may include clusters consisting of multiple hosts (e.g., physical servers) in racks. Hypervisors may be added to each host to create and run virtual machines. Virtual machines emulate computer systems and may be referred to as guest machines. To add a hypervisor to a host, an administrator may perform procedures using software to install specific software applications and apply specific network configurations, security configurations, power management configurations, and the like based on the specification of the host. The hypervisors may be connected to and managed by a virtualization management system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Data centers may include clusters that consist of numerous host systems (e.g., physical servers) included in an enclosure (e.g., rack). To set up the clusters, administrators may plug the host systems physically into the racks and may connect various cables to provide electricity to and/or enable communication between the host systems of the clusters and from cluster to cluster. For example, each host system may be communicatively coupled to a network within the data center. Once the host systems are connected to the network, a virtualization manager also connected to the network may be used to perform the remaining setup operations on each host system, such as installing and configuring a hypervisor to create and run virtual machines. Installing and configuring the hypervisor may include installing certain software packages and applying specific network configurations, security configurations (e.g., firewalls), power management settings, and the like. Repeating the process of installing and configuring the hypervisor manually and individually on each host system is cumbersome, error-prone, and inefficient.

Accordingly, described herein are methods and systems for cloning a hypervisor automatically to numerous host systems at substantially the same time. In an example, after a first hypervisor is installed successfully and configured on a host system, a set of configuration parameters of the existing hypervisor may be extracted and stored in a data store of a virtualization manager. Subsequently, a user may request to install and configure one or more cloned hypervisors on one or more host systems in the data center. The virtualization manager may identify the existing hypervisor by matching the set of configuration parameters with configuration parameters entered for the cloned hypervisors. The virtualization manager may transmit one or more cloning commands to the one or more host systems to install and configure the one or more cloned hypervisors according to the set of configuration parameters of the existing hypervisor that is identified.

According to some aspects of the disclosure, a list of existing hypervisors operating in a satisfactory state may be presented to a user on a graphical user interface (GUI) of a client device. That is, existing hypervisors may be available for cloning if the virtualization manager determines that the existing hypervisors are operating as intended on their host systems, as described more fully below. In other words, existing hypervisors that are operating in an unsatisfactory state are filtered from cloning selection.

Upon selecting the existing hypervisor to be cloned as the one or more cloned hypervisors, the existing hypervisor's configuration parameters may be populated and presented in editable fields in separate windows or category tabs (e.g., network, power management, software, etc.) of a configuration panel for each of the one or more cloned hypervisors. The user may select to add any number (e.g., 8, 12, 16, etc.) of cloned hypervisors with the configuration parameters of the selected existing hypervisor. The user may edit the configuration parameters as desired. Each added hypervisor may include certain unique fields, such as hypervisor system name, hypervisor address (e.g., Internet Protocol (IP) address) associated with a host system, and the like that are generated or entered via user input.

When the user determines that the desired configuration parameters are specified for each cloned hypervisor, the user may click a single button on the GUI to perform a bulk operation to install and configure the respective cloned hypervisors on each host system. Further, clone command validation may be performed when the user clicks the button to validate the configuration parameters for all of the hypervisors at the same time (e.g., bulk validation). For example, if the user entered an unreachable IP address, then the virtualization manager may detect an error, and the GUI may indicate the error by highlighting the IP address field, marking the IP address a bold color (e.g., red) with or without underlining, displaying a symbol, or using any suitable type of error notification technique.

If the configuration parameters in the clone command are validated by the virtualization manager, then the virtualization manager may transmit the clone command to install and configure the cloned hypervisor with its respective configuration parameters to each host system. The host systems may execute the clone commands using the configuration parameters to download and install the requested software packages, implement a specific communication protocol, apply a network configuration, security settings, and/or power management settings, and the like. The host systems may report the result of installation and configuration of each respective cloned hypervisor to the virtualization manager. Upon indication that the hypervisors are successfully installed and operating as intended on each host system, the host systems may be ready to serve a virtualization platform of numerous interconnected virtual machines created and run by the hypervisors.

Thus, the technology discussed herein may be advantageous because it significantly simplifies the process of creating multiple hypervisors, thereby reducing the amount of required computing and physical resources. In addition, it enables automatically cloning an existing hypervisor that is installed correctly and operating as intended using substantially the same configuration parameters of the existing hypervisor to one or more (e.g., bulk operation) host systems at the same time. The likelihood of the cloned hypervisors installing correctly and operating as intended on their respective host systems may be increased because just the existing hypervisors that are installed correctly and operating as intended on their host systems are identified and/or selected for cloning. Further, in another example, the technology provides validation of the configuration parameters for each of the one or more cloned hypervisors to be installed and configured prior to sending the clone commands to the host systems to install and the configure hypervisors, which may also increase the likelihood of the cloned hypervisors installing correctly and operating as intended.

Figure 1:
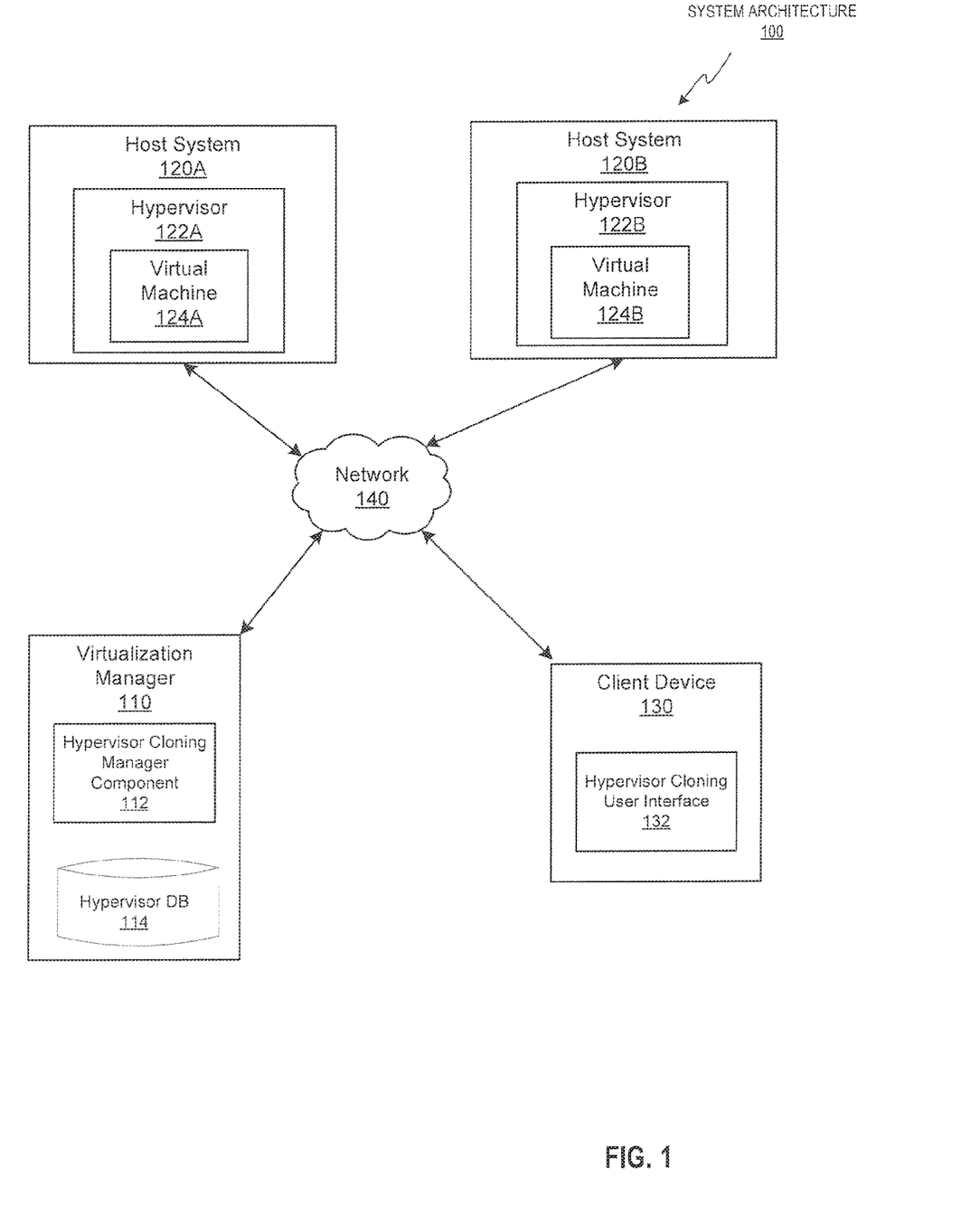
FIG. 1 depicts a high-level diagram of an example system architecture operating in accordance with one or more aspects of the present disclosure.

FIG. 1 illustrates an example system architecture 100 in which implementations of the disclosure may operate. The system architecture 100 may include a virtualization manager 110, a plurality of host systems 120A and 120B, and a client device 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, networks 140 may include a wired infrastructure (e.g., Ethernet).

Each of the host systems 120A and 120B may comprise one or more processors communicatively coupled to memory devices and input/output (I/O) devices. Each of the host systems 120A and 120B may run a plurality of virtual machines 124A and 124B by executing a hypervisor 122A and 122B, respectively, to abstract the physical layer, including processors, memory, and I/O devices, and present this abstraction to the virtual machines 124A and 124B as virtual devices. The virtual machines 124A and 124B may execute a guest operating system that may utilize the underlying virtual devices, including virtual processors, virtual memory, and virtual I/O devices. One or more applications may be running on a virtual machine under the guest operating system. The hypervisors 122A and 122B may create, run, manage, and monitor various aspects of the virtual machines 124A and 124B operation, including the processing, and storage, memory, and network interfaces. In an illustrative example, hypervisors 122A and 122B may be provided by a Virtual Desktop and Server Management (VDSM) daemon (not shown). The VDSM daemon may include an application programming interface (API) with which the virtualization manager 110 interfaces.

The VDSM of each host system 120A may provide status notifications to the virtualization manager 110 that indicate the operating state of the hypervisors 122A and 122B. For example, the status notification may be transmitted by the VDSM in response to a request from the virtualization manager to the API or after installation and configuration of the hypervisors 122A and 122B is completed on the host systems 120A and 120B. The status notification may indicate that the hypervisors 122A and 122B are operating in a satisfactory state (e.g., no existing errors, faults, memory issues, security issues, network issues, processing issues, etc.) or in an unsatisfactory state (e.g., existing errors, faults, memory issues, security issues, network issues, processing issues, etc.).

In certain implementations, host systems 120A and 120B may be grouped into one or more logical groups that may be also referred to as a "data center". A data center may represent the highest level of abstraction in a virtualization model. Each data center may be communicatively coupled, via the network 140, to one or more storage domains storing disk images for machines, such as virtual machines 124A and 124B.

The virtualization manager 110 may be hosted by a computer system (described in more details herein below with references to FIG. 7) and include one or more computer programs executed by the computer system for centralized management of the system architecture 100. In one implementation, the virtualization manager 110 may comprise various interfaces, including administrative interface, reporting interface, and/or application programming interface (API) to communicate with host systems 120A and 120B of system architecture 100, as well as to user portals, directory servers, and various other components, which are omitted from FIG. 1 for clarity.

Virtualization manager 110 may include hypervisor cloning management functionality that manages requests to clone existing hypervisors. In one example, virtualization manager 110 may include a hypervisor cloning manager component 112 and a hypervisor database 114. Hypervisor cloning manager component 112 may extract certain information, such as identification information (e.g., hypervisor name, hypervisor IP address, etc.), a set of configuration parameters (e.g., software packages, network settings, security settings, power management settings, etc.), and the like, and store the information in the hypervisor database 114 for each existing hypervisor 122A and/or 122B. Further, the hypervisor manager component 112 may store received operating states from the VDSM of the host systems 120A and/or 120B for the hypervisors 122A and 122B in the hypervisor database 114.

The hypervisor cloning manager component 112 may receive requests to install and configure one or more cloned hypervisors on other host systems. That is, although host systems 120A and 120B are shown, it should be understood that any number of host systems may be included in a data center. According to some aspects of the present disclosure, as described below, the requests may include identification information and/or configuration parameters of the one or more cloned hypervisors. The hypervisor cloning manager component 112 may find an existing hypervisor by searching the hypervisor database 114 that has a set of configuration parameters that matches the configuration parameters of the one or more cloned hypervisor. Upon identifying an existing hypervisor with similar configuration parameters, the hypervisor cloning manager component 112 may transmit one or more clone commands to the host systems to install and configure the cloned hypervisors according to the configuration parameters of the existing hypervisor.

Additionally, according to some aspects of the present disclosure, prior to receiving a request to install and configure cloned hypervisors, the hypervisor cloning manager component 112 may provide a hypervisor cloning user interface (UI) 132 including a list of existing hypervisors that are operating in a satisfactory state for presentation on the client device 130. In an example, the hypervisor cloning UI 132 may be presented by a web browser operating on the client device 130 or any suitable client-side application. The client device 130 may include any suitable computing device, such as a smartphone, tablet, laptop, desktop, server, or the like. As such, client device 130 may include one or more non-transitory, machine-readable storage media that store computer instructions and one or more processing devices that execute the stored computer instructions. For example, the client device 130 may display the hypervisor cloning UI 132, receive user input via the hypervisor cloning UI 132 and send corresponding data back to the virtualization manager 110 using computer instructions stored on the one or more storage media and executed by the processing devices.

In some examples, the UI 132 may include various graphical components that enable the user to select a desired existing hypervisor and add cloned hypervisors with similar configuration parameters as the existing hypervisor. Upon adding the cloned hypervisors, additional windows or UIs may be displayed for each respective cloned hypervisor to present the configuration parameters of the existing hypervisor in editable fields for each cloned hypervisor. The user may edit any configuration parameters. When the user is satisfied with the configuration parameters for each of the one or more cloned hypervisors, the user may click a single button, which causes the request to install and configure the one or more cloned hypervisors to be transmitted to the hypervisor cloning manager component 112.

As described in more detail below, the hypervisor cloning manager component 112 may perform command validation prior to transmitting clone commands to the one or more host systems. Upon validating hypervisor identification information and configuration parameters, the hypervisor cloning manager component 112 may transmit a clone command to each respective host system. The host system may execute the clone commands and transmit a status notification indicating whether installation is successful and the operating state of the cloned hypervisor. The operating states may include text description and/or numerical identifiers associated with the text descriptions. For example, a satisfactory operating state may indicate that the hypervisor is operating as intended (e.g., without errors/faults and/or without resource issues (memory, processing, network, etc.)). An unsatisfactory operating state may indicate that the hypervisors is not operating as intended (e.g., includes one or more errors/faults and/or resource issue).

In another example, the hypervisor cloning UI 132 may be a command line interface to perform some of the disclosed cloning techniques. In one example, the user may enter a file (e.g., eXtensible Markup Language (XML), JavaScript Object Notation (JSON), etc.) that includes a list of hypervisors to add and a list of configuration parameters for each hypervisor in a command and the command may transmit the request with the file to the hypervisor cloning manager component 112. In yet another example, the hypervisor cloning UI 132 may be a representational state transfer (REST) application programming interface (API) or a web-based interface that is used to perform some of the disclosed cloning techniques. For example, a script may be executed that transmits the request to install and configure one or more cloned hypervisors to the hypervisor cloning manager component 112. In some examples, the hypervisor cloning UI 132 may provide an interactive shell (e.g., Secure Shell (SSH)) where the user enters hypervisors and parameters of the hypervisors to add, which may be transmitted to the hypervisor cloning manager component 114 for cloning.

Figure 2:
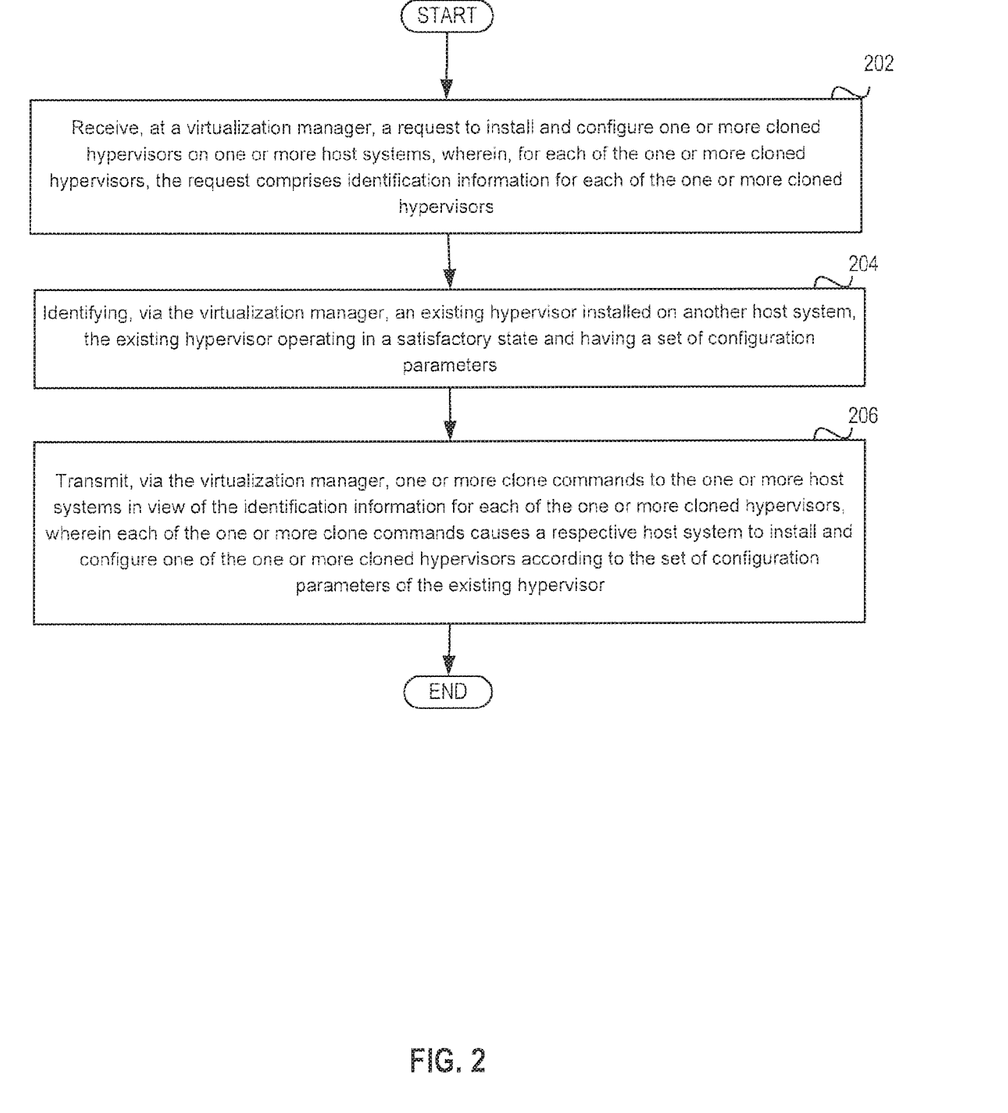
FIG. 2 depicts a flow diagram of an example method for cloning an existing hypervisor operating in a satisfactory state via a virtualization manager, in accordance with one or more aspects of the present disclosure.

FIG. 2 depicts a flow diagram of an example method 200 for cloning an existing hypervisor operating in a satisfactory state via the hypervisor cloning manager component 112 of the virtualization manager 110, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by hypervisor cloning manager component 112 executed by one or more processing devices of the computer system hosting the virtualization manager 110.

Method 200 may begin at block 202. At block 202, a processing device executing the hypervisor cloning manager component 116 may receive a request to install and configure one or more cloned hypervisors on one or more host systems in a data center. The request may be received via a graphical user interface (GUI), a command line interface, a shell interface, a web-interface (e.g., REST API) presented on the client device 130. The request may include identification information for each of the one or more cloned hypervisors. The identification information may include a hypervisor name, a hypervisor address (e.g., IP address), which may be associated with the host system to which the cloned hypervisor is to be installed and configured, and the like. The identification information is unique for each of the cloned hypervisors. In some examples, the user may enter the identification information. In other examples, the identification information may be generated by the processing device. For example, if a cloned hypervisor name fits a certain name template (e.g., combination of string and number ("bluehost1")), then the processing device may generate the hypervisor name (e.g., "bluehost2") by incrementing a number included in the template. A similar technique may be used for the hypervisor address. The auto-generated identification information may be edited by the user if desired.

Further, in some examples, the request also includes one or more configuration parameters (e.g., software packages, communication protocol, network configuration, security settings, power management settings, etc.) for the one or more cloned hypervisors. Also, in some examples, prior to receiving the request to install and configure the one or more cloned hypervisors, the processing device may provide the hypervisor cloning UI 132 including a list of existing hypervisors operating in the satisfactory state for presentation on the client device 130. Alternatively, the processing device may transmit a list of existing hypervisors operating in the satisfactory state to the client device 130 for presentation in a command line interface, a shell interface, etc. The user may select one of the existing hypervisors from the list to clone.

At block 204, the processing device may identify an existing hypervisor (e.g., hypervisor 122A and/or 122B) installed on another host system (e.g., host system 120A and/or 120B) in the data center. The existing hypervisor that is identified may be operating in a satisfactory state and have a set of configuration parameters. The processing device may query the hypervisor database 114 to retrieve the operating state of the existing hypervisor and its set of configuration parameters. Further, identifying the existing hypervisor may include searching the hypervisor database 114 for existing hypervisors that include a satisfactory state and a set of configuration parameters that substantially match the one or more configuration parameters of the cloned hypervisors.

The processing device may also validate, for each of the one or more cloned hypervisors, at the same time, the identification information for each of the one or more cloned hypervisors and the set of configuration parameters of the existing hypervisor after identifying the existing hypervisor. If there is an error with the identification information (e.g., unreachable address, non-unique name) or the set of configuration parameters, then the processing device may transmit an error notification to the client device 130 that indicates validation failed.

If validation is successful, then at block 206, the processing device may transmit one or more clone commands to the one or more host systems in view of the identification information for each of the one or more cloned hypervisors. Each of the one or more clone commands may cause a respective host system to install and configure one of the one or more cloned hypervisors according to the set of configuration parameters of the existing hypervisor. Accordingly, the presently disclosed techniques may enable performing a cloning operation in bulk at the same time if numerous cloned hypervisors are to be installed and configured on numerous host systems.

The clone command may cause the host system to access a software package repository to download and install the software packages identified in the configuration parameters, to set its security (e.g., firewall) settings, network settings (e.g., select a communication protocol), power management settings (e.g., when to hibernate, how long to hibernate before powering down, etc.), and the like according to the configuration parameters. In some examples, the user may have modified the set of configuration parameters of the existing hypervisor for one or more of the cloned hypervisors prior to the clone commands being transmitted.

In some examples, the processing device may receive a status notification from each of the one or more host systems after installing and configuring the one or more cloned hypervisors. The status notification indicates if a cloned hypervisor is installed successfully and operating in the satisfactory state. Also, the processing device may periodically request the VDSM of each of the host systems executing an existing hypervisor or cloned hypervisor to provide an operating state to maintain current records for the hypervisors in the hypervisor database 114.

Figure 3:
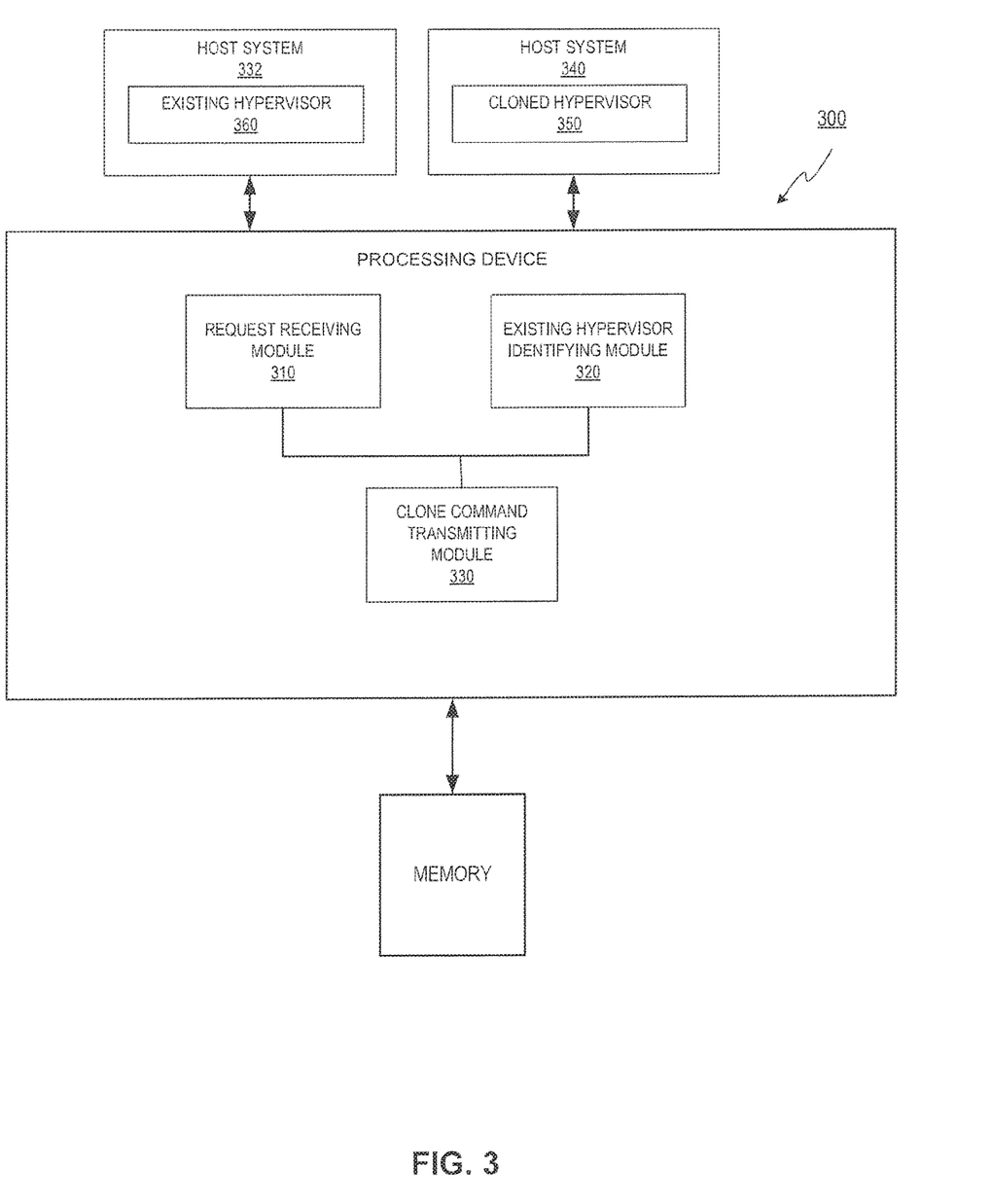
FIG. 3 depicts a block diagram of an example computer system, in accordance with one or more aspects of the present disclosure.

FIG. 3 depicts a block diagram of an example computer system 300, in accordance with one or more aspects of the present disclosure. Computer system 300 may be the same or similar to the computer system that hosts the virtualization manager 110 and may include one or more processing devices and one or more memory devices. In the example shown, computer system 300 may include request receiving module 310, existing hypervisor identifying module 320, and clone command transmitting module 330. Also, as depicted, computer system 300 may be communicatively coupled to host system 332 and 340.

Request receiving module 310 may receive a request to install and configure one or more cloned hypervisors 350 on one or more host systems 340 in a data center. The request may be received via the hypervisor cloning UI 132 presented on the client device 130. The request may include identification information for each of the one or more cloned hypervisors 350 and, in some examples, configuration parameters for the one or more cloned hypervisors 350.

The existing hypervisor identifying module 320 may identify an existing hypervisor 360 installed on another host system 332 in the data center. The existing hypervisor 360 may be operating in a satisfactory state and have a set of configuration parameters. The existing hypervisor identifying module 320 may identify the existing hypervisor 360 by finding the existing hypervisor 360 with the set of configuration parameters that match the one or more configuration parameters of the cloned hypervisors 350.

The clone command transmitting module 330 may transmit one or more clone commands to the one or more host systems 340 in view of the identification information for each of the one or more cloned hypervisors 350. For example, the clone command transmitting module 330 may use the hypervisor addresses to determine which host systems 340 are to receive the clone commands. Each of the one or more clone commands may cause a respective host system 340 to install and configure one of the one or more cloned hypervisors 350 according to the set of configuration parameters of the existing hypervisor 360 that was identified.

Figure 4:
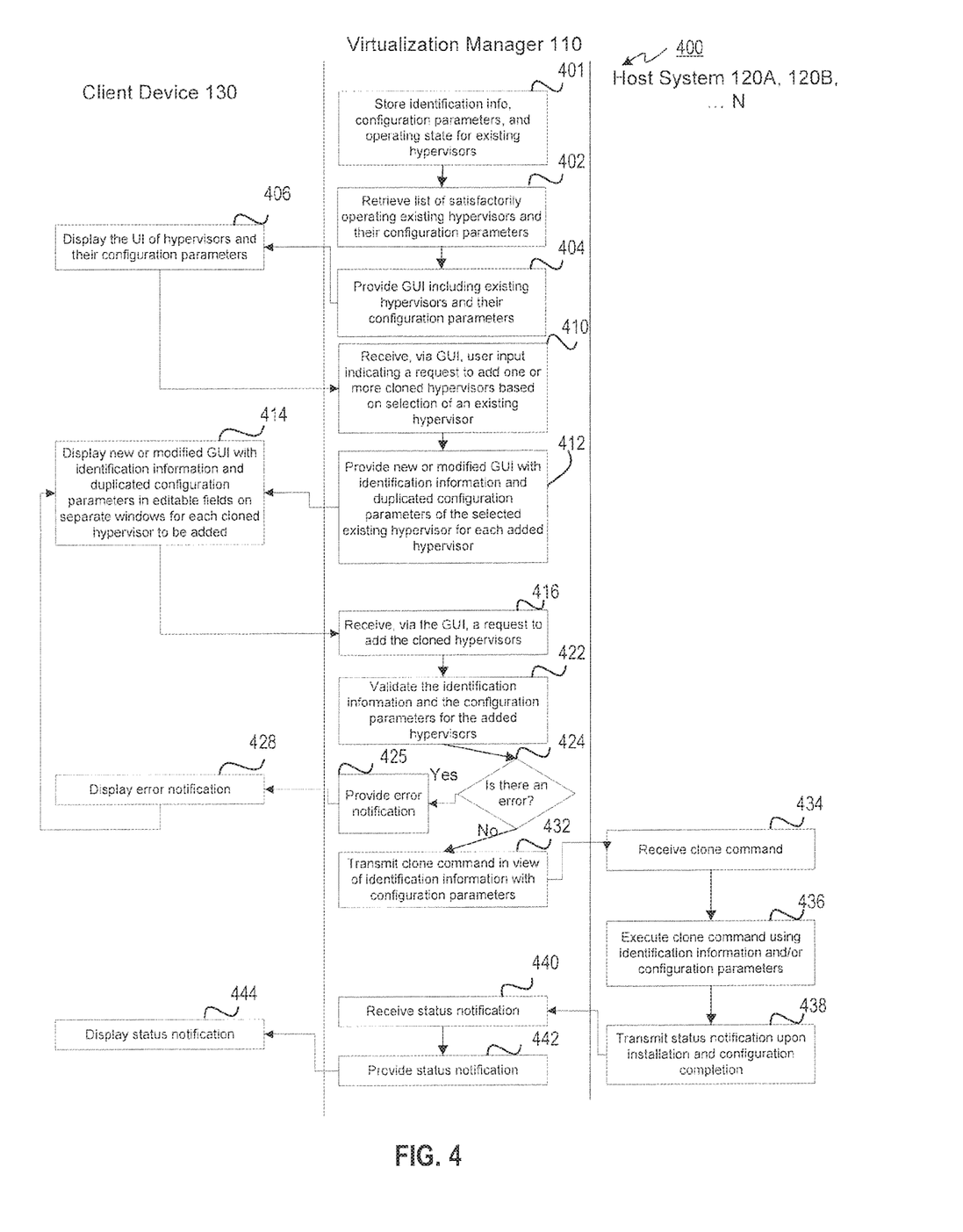
FIG. 4 depicts a flow diagram of an example method for cloning an existing hypervisor operating in a satisfactory state after validating various information via a virtualization manager, in accordance with one or more aspects of the present disclosure.

FIG. 4 depicts a flow diagram of an example method 400 for cloning an existing hypervisor operating in a satisfactory state after validating various information via the hypervisor cloning manager component 112 of the virtualization manager 110, in accordance with one or more aspects of the present disclosure. Method 400 includes operations performed by the client device 130, the virtualization manager 110, and the host systems 120A, 120B, N. The portions of method 400 that are performed by the virtualization manager 110 may be similar to method 200. Also, method 400 may be performed in the same or a similar manner as described above in regards to method 200. Method 400 may be performed by processing devices of a computer system hosting the virtualization manager 110 and executing the cloning manager component 112, processing devices of the client device, and processing devices of the host systems 120A, 120B, N.

Method 400 may begin at block 401. At block 401, the virtualization manager 110 may store, in the hypervisor database 114, identification information (e.g., hypervisor name, hypervisor address, etc.), extracted configuration parameters, and operating states for existing hypervisors that are operating on host systems in the data center. At block 402, the virtualization manager 110 may retrieve, from the hypervisor database 114, a list of existing hypervisors that are operating in a satisfactory state and the sets of configuration parameters for the existing hypervisors operating in the satisfactory states. At block 404, the virtualization manager 110 may provide a GUI including the list of existing hypervisors and their configuration parameters for presentation on the client device 130.

At block 406, the client device 130 may display the GUI including the list of hypervisors and their configuration parameters. For example, the GUI may display the list of existing hypervisors operating in the satisfactory state on the screen of the client device 130. At block 410, the virtualization manager 110 may receive, via the GUI, user input indicating a request to add one or more cloned hypervisors based on a selection of one of the existing hypervisors from the list. At block 412, the virtualization manager 110 may provide, to the client device 130, a new or modified GUI with duplicated configuration parameters of the selected existing hypervisor for each of the cloned hypervisors to be added. At block 414, the client device 130 may display the new or modified GUI with identification information and the duplicated configuration parameters in editable field on separate windows or tabs of a configuration panel for each of the cloned hypervisors to be added, as shown in detail in the example GUI in FIG. 7.

At block 416, the virtualization manager 110 may receive, via the GUI, a request to add the cloned hypervisors. The request may be received based on the user clicking a single control element (e.g., a single button) on the GUI. The request may be associated with the identification information and configuration parameters of the existing hypervisor for each of the one or more cloned hypervisors.

At block 422, the virtualization manager 110 may validate the identification information and the configuration parameters for the cloned hypervisors. That is, the virtualization manager 110 may perform bulk validation on the identification information and/or the sets of configuration parameters submitted for each cloned hypervisor at the same time. The virtualization manager 110 may determine whether there is an error with the identification information and/or the configuration parameters in block 424. If there is an error (e.g., an unreachable hypervisor address), the virtualization manager 110 provides an error notification for presentation on the client device 130 at block 425. The error notification may be presented in the GUI using various error notification techniques, such as highlighting the editable field and/or the information (e.g., identification information and/or configuration parameters) associated with the error, changing the text color (e.g., to red) of the information associated with the error, displaying a symbol (e.g., exclamation mark) next to the editable field and/or the information associated with the error, or the like. At block 428, the client device 139 may display the error (e.g., in the GUI). Processing may return to block 414, and the client device 130 may display the GUI with the editable fields so the user can amend the error and resend the request by clicking the button on the GUI. At block 416, the virtualization manager 110 may begin validation of the request again.

If there is no error found on the initial submission of the request or on resubmission of the request, the virtualization manager 110 may transmit one or more clone commands to one or more host systems in view of the identification information at block 432. That is, the virtualization manager 110 may transmit the clone command to the host systems 120A, 120B, N associated with the hypervisor addresses. The clone commands may include the set of configuration parameters associated with the existing hypervisor selected to be cloned or may include modified configuration parameters if the user made any edits.

Each respective host system 120A, 120B, N may receive the clone command at block 434. At block 436, each respective host system 120A, 120B, N may execute the clone command using the identification information and/or the configuration parameters. At block 438, the host systems 120A, 120B, N may transmit a status notification upon installation and configuration completion. For example, the VDSM operating on each of the host systems may transmit the status notification. The status notification may include an indication of the operating state (e.g., satisfactory or unsatisfactory) of the cloned hypervisor.

At block 440, the virtualization manager 110 may receive the status notification. The virtualization manager 110 may store the information provided in the status notification in the hypervisor database 114. At block 442, the virtualization manager 110 may provide the status notification to the client device (e.g., as part of a GUI). At block 444, the client device may display the status notification. For example, the client device 130 may display an installation confirmation GUI that indicates whether the installation and configuration was successful and whether the operating state of the cloned hypervisor is satisfactory.

Figure 5:
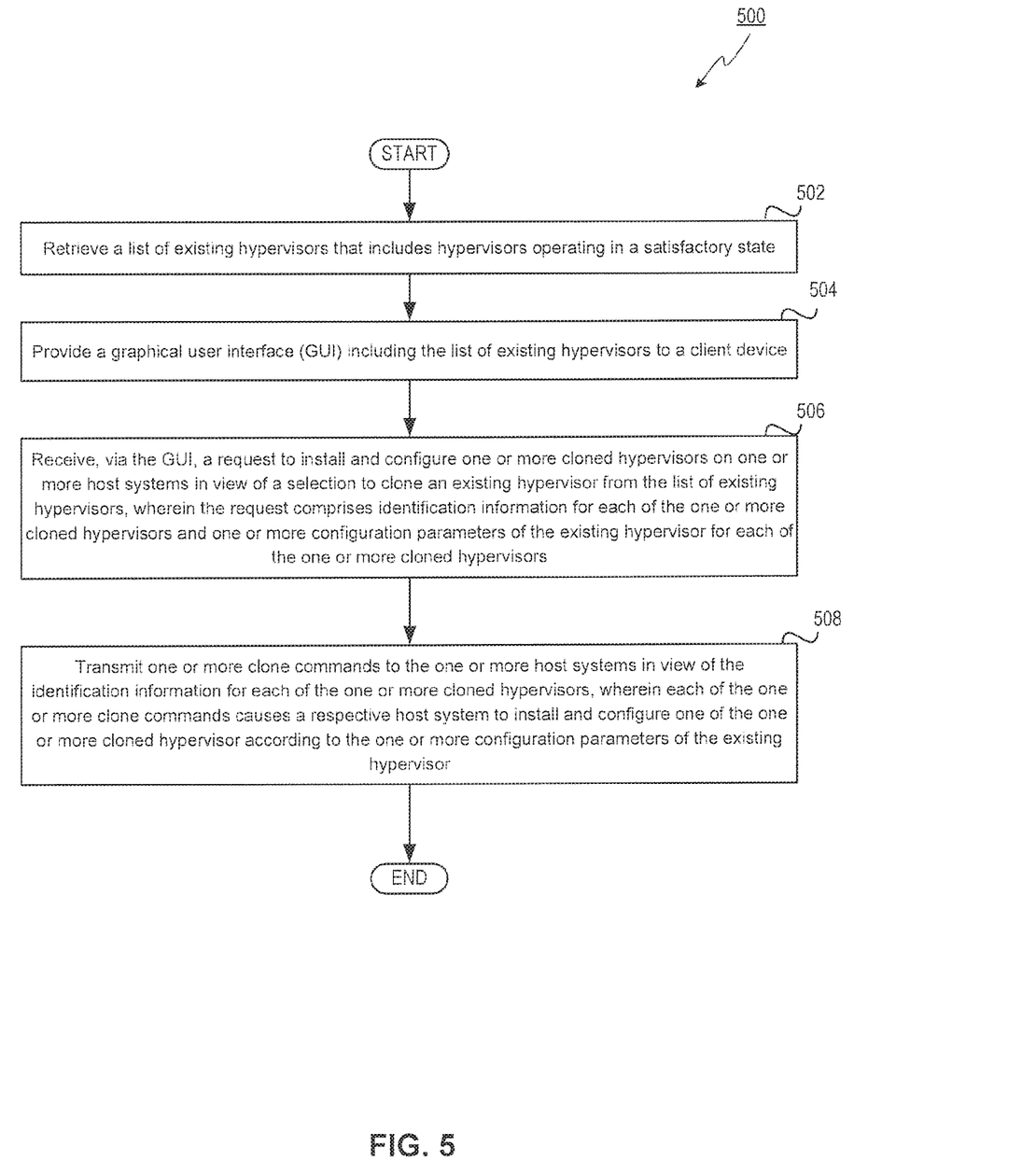
FIG. 5 depicts a flow diagram of another example method for cloning an existing hypervisor operating in a satisfactory state via a virtualization manager, in accordance with one or more aspects of the present disclosure.

FIG. 5 depicts a flow diagram of another example method 500 for cloning an existing hypervisor operating in a satisfactory state via the hypervisor cloning manager component 112 of the virtualization manager 110, in accordance with one or more aspects of the present disclosure. Method 500 may be similar to method 200 and may be performed in the same or a similar manner as described above in regards to method 200. Method 500 may be performed by processing devices of a computer system hosting the virtualization manager 110 and executing the hypervisor cloning manager component 112. Method 500 may begin at block 502.

At block 502, a processing device may retrieve a list of existing hypervisors that includes hypervisors operating in a satisfactory state and excludes hypervisors operating in an unsatisfactory state. The list may be retrieved from the hypervisor database 114 and the operating states for each of the existing hypervisors may have been previously stored by the processing device in the hypervisor database 114. For example, the processing device may have previously requested the operating state of the existing hypervisors from the VDSMs of each of the host systems running the existing hypervisors and stored the operating states in the hypervisor database 114.

At block 504, the processing device may provide the hypervisor cloning UI 132 (e.g., graphical user interface (GUI)) including the list of existing hypervisors to the client device 130. As described above, the client device 130 may display the hypervisor cloning UI 132 and the user may select one of the existing hypervisors to clone by adding one or more cloned hypervisors using the configuration parameters of the selected existing hypervisor. The user may click a single button on the hypervisor cloning UI 132 to transmit the request to install and configure the one or more cloned hypervisors to the virtualization manager 110.

At block 506, the processing device of the virtualization manager 110 may receive, via the hypervisor cloning UI 132, the request to install and configure the one or more hypervisors on one or more host systems in a data center in view of the selection to clone the existing hypervisor from the list of existing hypervisors. The request may include identification information for each of the one or more cloned hypervisors and one or more configuration parameters of the existing hypervisor for each of the one or more cloned hypervisors.

Further, at block 508, the processing device may transmit one or more clone commands to the one or more host systems in view of the identification information for each of the one or more cloned hypervisors. Each of the one or more clone commands may cause the respective host system to install and configure one of the one or more cloned hypervisors according to the one or more configuration parameters of the existing hypervisor. In some examples, the user may have modified some of the configuration parameters displayed in the GUI and the modified configuration parameters may be used to install and configure the cloned hypervisors on the host systems.

Figure 6:
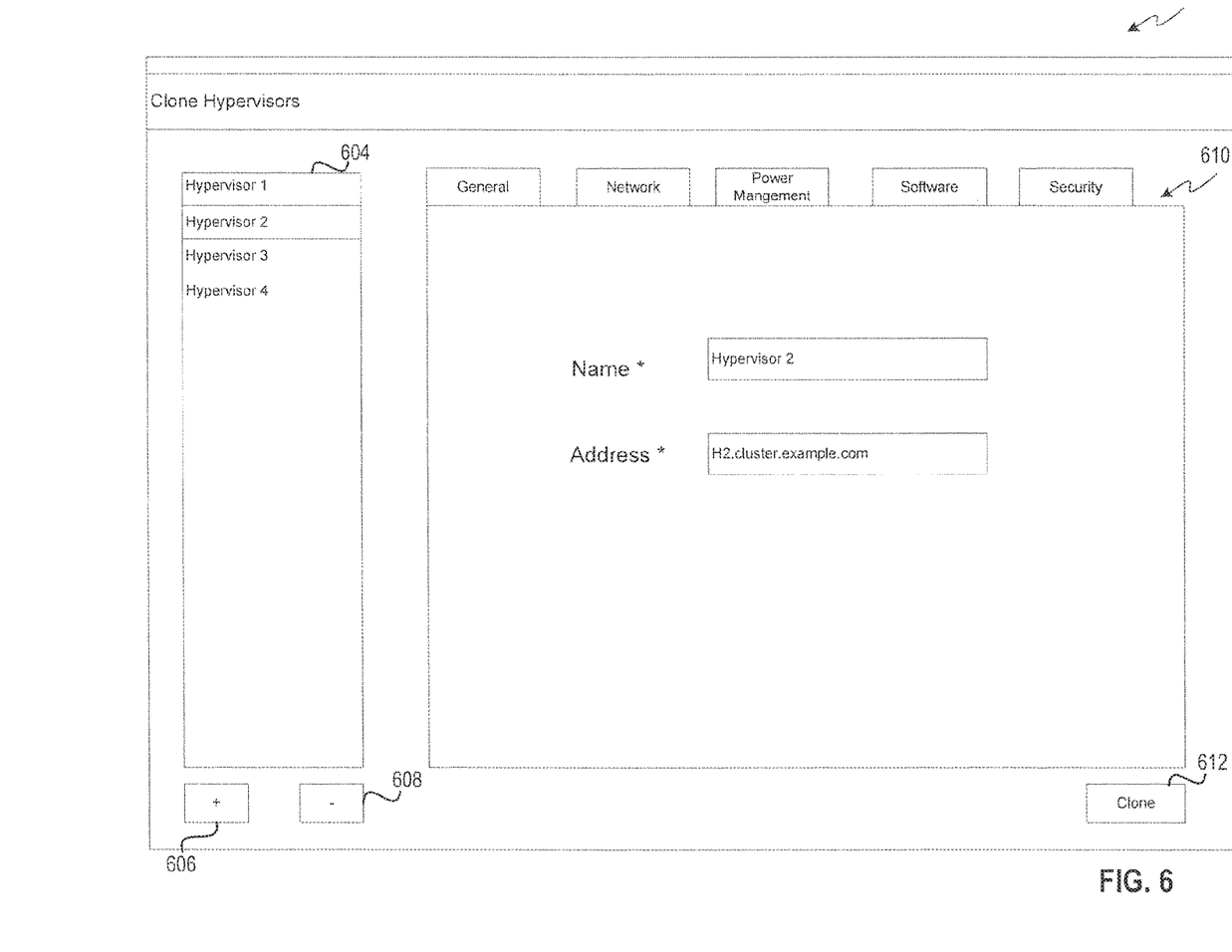
FIG. 6 depicts an example graphical user interface (GUI) used for cloning existing hypervisors, in accordance with one or more aspects of the present disclosure.

FIG. 6 depicts an example graphical user interface (GUI) 600 used for cloning existing hypervisors, in accordance with one or more aspects of the present disclosure. The GUI 600 may be presented on the client device 130. As depicted, the GUI 600 includes a list 604 of hypervisors. The list 604 may include one or more existing hypervisors identified by the hypervisor cloning manager component 112. The existing hypervisors that are included in the list may be operating in a satisfactory state. In other words, to improve the likelihood that cloned hypervisors install and configure properly and operate as intended, the GUI may just present hypervisors that are successfully installed and operating in the satisfactory state as cloning options. For example, "Hypervisor 1" in the list 604 is an existing hypervisor that is operating in the satisfactory state.

The user may select "Hypervisor 1," for example, by clicking on it, and may choose to add cloned hypervisors by clicking a plus button 606. Clicking the plus button 606 may cause another hypervisor entry in the list 604 to be displayed. In the depicted example, the user added three cloned hypervisors: "Hypervisor 2," "Hypervisor 3," and "Hypervisor 4" by selecting existing "Hypervisor 1". If the user desires to remove one of the cloned hypervisors, the user may select the hypervisor to be removed from the list 604 and click the minus button 608, which deletes the entry from the list 604.

Each of the cloned hypervisors that are added may initially include the configuration parameters of the selected existing hypervisor (e.g., "Hypervisor 1"). For example, a configuration panel 610 may include various tabs (e.g., "General," "Network," "Power Management," "Software, Security," etc.). That is, the configuration parameters of the selected existing hypervisor may duplicate and may populate various editable fields included in the configuration panel 610 for each of the cloned hypervisors. However, there may be certain editable fields that include unique information for each cloned hypervisor.

As depicted, "Hypervisor 2" is selected in the list 604. Accordingly, information for "Hypervisor 2" is displayed in the configuration panel 610. The "General" tab is selected and editable fields for the hypervisor name and address are shown as being populated with a unique name "Hypervisor 2" and unique address "H2.cluster.example.com". The name and address may be automatically generated or may be entered by the user. Further, the tabs that are not selected, "Network," "Power Management," "Software," and "Security" may include editable fields that are populated with the configuration parameters of the selected existing hypervisor (e.g., "Hypervisor 1"). The user may choose to edit any of the configuration parameters as desired.

When the user is satisfied with the number of cloned hypervisors that are added and the identification information/configuration parameters for each of the cloned hypervisors, the user may click a clone button 612, which causes the hypervisor cloning manager component 112 to initiate the process of installing and configuring the cloned hypervisors. Thus, if the user added more than one cloned hypervisor, this may initiate a bulk cloning operation to be performed by the hypervisor cloning manager component 112.

The hypervisor cloning manager component 112 may validate the identification information and the configuration parameters for each of the one or more cloned hypervisors. As described above, if an error is found, the hypervisor cloning manager component 112 may transmit an error notification to the client device 130, and the GUI 600 may display the error notification. For example, the GUI 600 may highlight the editable field and/or the information associated with the error, change the text color of the editable field and/or the information associated with the error, display a symbol next to the editable field and/or the information associated with the error, or the like.

Further, if validation is successful, the hypervisor cloning manager component 112 may provide a validation successful message to the client device 130 (e.g., by updating the GUI 600 to include the validation successful message). The validation successful message may indicate that validation was successful and that one or more clone commands have been sent to one or more host systems. Also, upon installation and configuration completion, the hypervisor cloning manager component 112 may transmit a status notification to the client device 130 (e.g., by updating the GUI 600 to include the status notification). For example, the status notification may include an indication of whether the cloned hypervisors were installed and configured correctly and whether the cloned hypervisors are operating in a satisfactory operating state.

Figure 7:
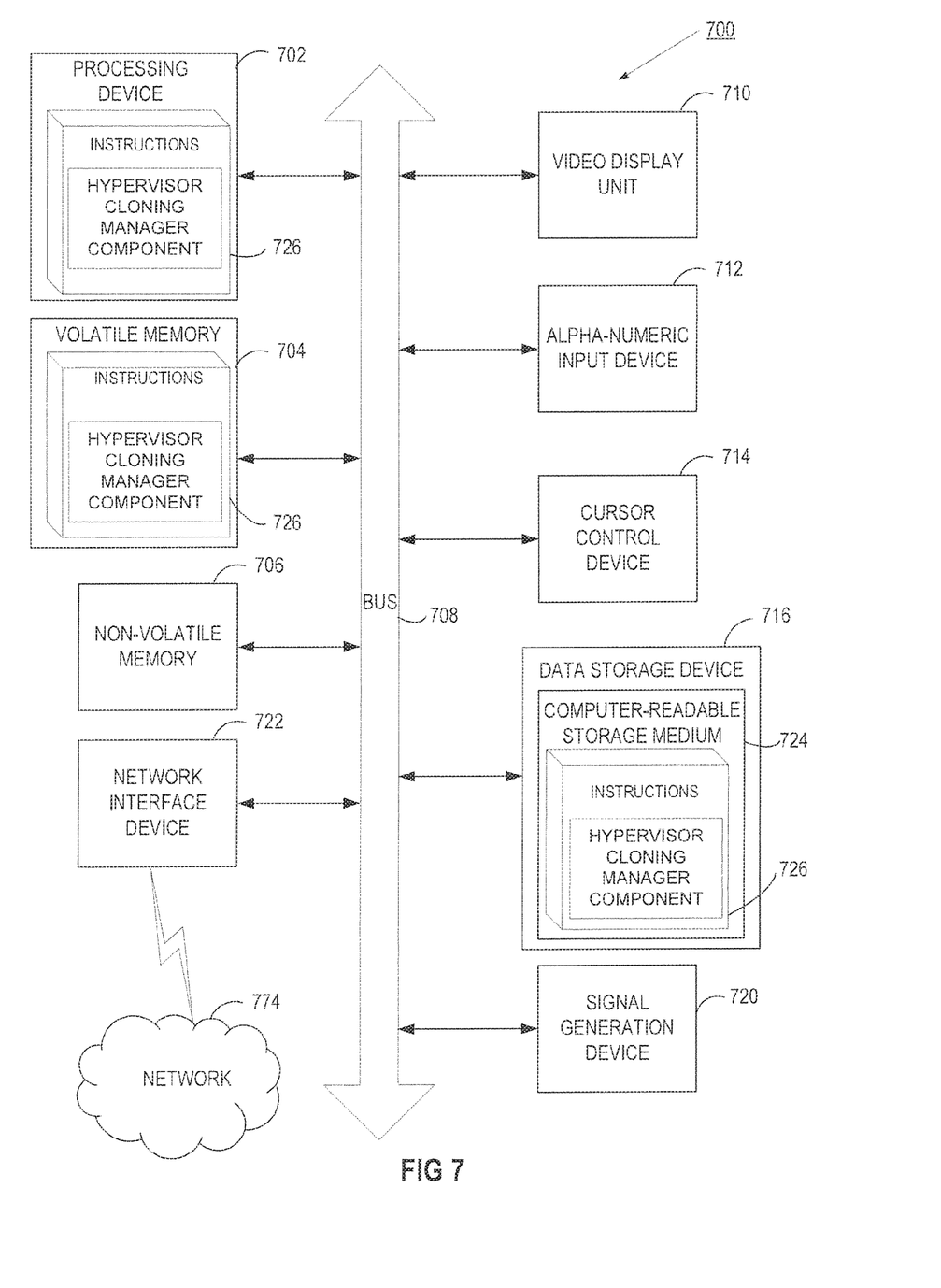
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to a computing device within system architecture 100 of FIG. 1. The computer system 700 may host the virtualization manager 110. The computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions encoding hypervisor cloning manager component 112 of FIG. 1 for implementing methods 200, portions of method 400, or method 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, 500, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, at a virtualization manager residing on a first host system separate from one or more second host systems, a request to install and configure one or more cloned hypervisors on the one or more second host systems, wherein, for each of the one or more cloned hypervisors, the request comprises identification information for each of the one or more cloned hypervisors;
   identifying, via the virtualization manager, an existing hypervisor installed on a third host system separate from the first host system, the existing hypervisor operating in a satisfactory state and having a set of configuration parameters; and
   transmitting, via the virtualization manager, one or more clone commands to the one or more second host systems in view of the identification information for each of the one or more cloned hypervisors, wherein each of the one or more clone commands causes a respective host system to install and configure one of the one or more cloned hypervisors according to the set of configuration parameters of the existing hypervisor.

2. The method of claim 1, further comprising validating, for each of the one or more cloned hypervisors, at the same time, the identification information for each of the one or more cloned hypervisors and the set of configuration parameters of the existing hypervisor.

3. The method of claim 1, wherein the request further comprises one or more configuration parameters of the one or more cloned hypervisors.

4. The method of claim 3, wherein identifying the existing hypervisor comprises finding the existing hypervisor with the set of configuration parameters that match the one or more configuration parameters.

5. The method of claim 1, further comprising receiving a status notification from each of the one or more second host systems after installing and configuring the one or more cloned hypervisors, wherein the status notification indicates if a cloned hypervisor is installed successfully and operating in the satisfactory state.

6. The method of claim 1, wherein the identification information for each of the one or more cloned hypervisors comprises a hypervisor name and a hypervisor address associated with the one or more second host systems.

7. The method of claim 1, further comprising providing, prior to receiving the request, a graphical user interface (GUI) comprising a list of hypervisors operating in the satisfactory state for presentation on a client device, wherein the list of hypervisors comprises the existing hypervisor.

8. The method of claim 1, further comprising storing, prior to receiving the request, in a database, identification information, a set of configuration parameters, and an operating state for each existing hypervisor operating on one or more other host systems.

9. The method of claim 1, wherein the set of configuration parameters of the existing hypervisor comprise one or more of power management settings, a communication protocol, a network configuration, security settings, or software packages.

10. The method of claim 1, wherein the request is received in response to at least one of a command entered in a command line interface of the client device, an instruction entered in a representational state transfer application programming interface (API) accessed on the client device, or a selection of a control element in a graphical user interface (GUI) presented on the client device.

11. A system comprising:
a memory;
a processing device operatively coupled to the memory to execute a virtualization manager residing on a first host system separate from one or more second host systems, the processing device to:
  receive a request to install and configure one or more cloned hypervisors on the one or more second host systems, wherein, for each of the one or more cloned hypervisors, the request comprises identification information for each of the one or more cloned hypervisors;
  identify an existing hypervisor installed on a third host system separate from the first host system, the existing hypervisor operating in a satisfactory state and having a set of configuration parameters; and
  transmit one or more clone commands to the one or more second host systems in view of the identification information for each of the one or more cloned hypervisors, wherein each of the one or more clone commands causes a respective host system to install and configure one of the one or more cloned hypervisors according to the set of configuration parameters of the existing hypervisor.

12. The system of claim 11, wherein the processing device is further to validate, for each of the one or more cloned hypervisors, at the same time, the identification information for each of the one or more cloned hypervisors and the set of configuration parameters of the existing hypervisor.

13. The system of claim 11, wherein the request further comprises one or more configuration parameters of the one or more cloned hypervisors, and wherein identifying the existing hypervisor further comprises the processing device to find the existing hypervisor with the set of configuration parameters that match the one or more configuration parameters.

14. The system of claim 11, wherein the processing device is further to receive a status notification from each of the one or more second host systems after installing and configuring the one or more cloned hypervisors, the status notification indicating if a cloned hypervisor is installed successfully and operating in the satisfactory state.

15. The system of claim 11, wherein the processing device is further to store, prior to receiving the request, identification information, a set of configuration parameters, and an operating state for each existing hypervisor operating on one or more other host systems.

16. A non-transitory machine-readable storage medium storing instructions that cause a processing device to execute a virtualization manager that is separate from one or more host systems, the instructions further cause the processing device to:
  retrieve a list of existing hypervisors that includes hypervisors operating in a satisfactory state;
  provide a graphical user interface (GUI) comprising the list of existing hypervisors to a client device;
  receive, via the GUI, a request to install and configure one or more cloned hypervisors on the one or more host systems in view of a selection to clone an existing hypervisor from the list of existing hypervisors, wherein the request comprises identification information for each of the one or more cloned hypervisors and one or more configuration parameters of the existing hypervisor for each of the one or more cloned hypervisors; and
  transmit one or more clone commands to the one or more host systems in view of the identification information for each of the one or more cloned hypervisors, wherein each of the one or more clone commands causes a respective host system to install and configure one of the one or more cloned hypervisor according to the one or more configuration parameters of the existing hypervisor.

17. The non-transitory machine-readable storage medium of claim 16, wherein the request is received in response to the selection of a clone button on the GUI presented on the client device, wherein:
  the GUI presents a selection screen including the list of existing hypervisors comprising the existing hypervisor; and
  upon one or more selections to add the one or more cloned hypervisors based on the existing hypervisor, the processing device modifies the GUI to display the identification information for each of the one or more cloned hypervisors and the one or more configuration parameters of the existing hypervisor in editable fields on separate tabs of a configuration panel of the GUI for each of the one or more cloned hypervisors.

18. The non-transitory machine-readable storage medium of claim 17, wherein the processing device is further to provide an error notification for presentation by the GUI on the client device upon determining that there is an error with the identification information or the one or more configuration parameters for any of the one or more cloned hypervisors, wherein the error notification is presented by the GUI on the client device by:
   highlighting an editable field for the identification information or the one or more configuration parameters associated with the error;
   changing text color in the editable field for the identification information or the one or more configuration parameters associated with the error; or
   displaying a symbol next to or in the editable field for the identification information or the one or more configuration parameters associated with the error.

19. The non-transitory machine-readable storage medium of claim 16, wherein the one or more cloned hypervisors comprises at least two cloned hypervisors, and wherein the processing device is further to validate, for the at least two cloned hypervisors, at the same time, the identification information and the one or more configuration parameters.

20. The non-transitory machine-readable storage medium of claim 16, wherein the processing device is further to store, prior to retrieving the list of existing hypervisors, identification information, a set of configuration parameters, and an operating state for each existing hypervisor operating on one or more other host systems.

* * * * *